May 2, 1939.  L. H. BROWN  2,156,911
MICROSCOPE
Original Filed Oct. 5, 1935  2 Sheets-Sheet 1

INVENTOR.
Leo H. Brown
BY
ATTORNEY.

May 2, 1939.　　　　L. H. BROWN　　　　2,156,911
MICROSCOPE
Original Filed Oct. 5, 1935　　2 Sheets-Sheet 2

INVENTOR.
Leo H. Brown
BY
ATTORNEY.

Patented May 2, 1939

2,156,911

UNITED STATES PATENT OFFICE 2,156,911

MICROSCOPE

Leo H. Brown, New York, N. Y.,

Refiled for abandoned application Serial No. 43,765, October 5, 1935. This application November 6, 1937, Serial No. 173,109

2 Claims. (Cl. 88—39)

This invention relates to microscopes and particularly, to the objective therefor, this application being refiled for my abandoned application, Serial No. 43,765, filed October 5th, 1935.

In microscope objectives commonly used, light passes through the transparent lens or lenses of the objective with attendant objectionable chromatic aberration. Various combinations of lenses have been employed to avoid such aberration but such combinations are expensive and never eliminate all chromatic aberration.

The so-called "achromatic" objective corrects only the primary spectrum, while the "apochromatic" objective, which represents the most advanced microscope objective available at present, corrects the primary and secondary spectrums without correcting the tertiary spectrum.

My invention contemplates the provision of a microscope objective employing mirrors including a curved mirror, whereby the light from the object does not pass through any lens to form a spectrum, but is reflected, thereby completely avoiding chromatic aberration and resulting in an inexpensive achromatic magnifying objective.

My invention further contemplates the provision of a microscope objective employing a comparatively small curved reflecting but magnifying surface which may be in the form of a concave ellipsoid of revolution or any other curve approximating such ellipsoid, and designed to be focused on an object close to the objective to create a magnified image capable of being again magnified by the eye piece of the microscope.

The various objects of my invention will be clear from the description which follows, and from the drawings, in which, Fig. 1 is a side elevation, partly in vertical section, of a microscope to which my invention has been applied.

Figure 1:
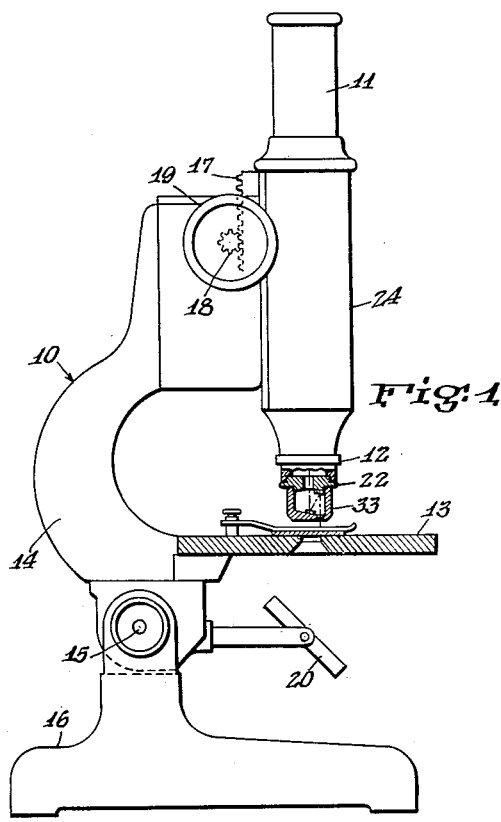
Figure 2:
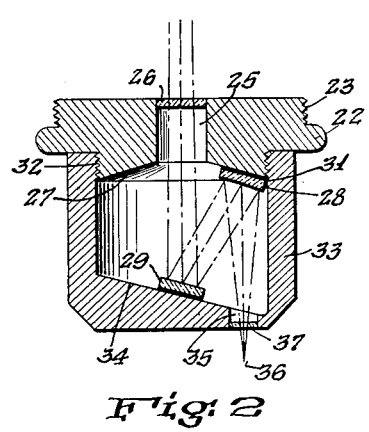
Fig. 2 is a vertical section of one form of my new objective.

In the practical embodiment of my invention, wherein my new objective replaces the objective customarily used in microscopes, and referring particularly to Figs. 1 and 2, the microscope 10 comprises the eye piece 11, the objective 12, the stage 13, and the arm 14 carrying the stage 13 at one end, and at its other end supporting the tube 24 carrying the eye piece and objective. The arm 14, as is usual, is pivoted as at 15 to the base 16. Means are provided for adjusting the distance of the objective 12 and the eye piece 11 as a unit from the stage 13, said means comprising the rack 17 on the supporting tube 24 for the eye piece and objective, and the pinion 18 pivoted on the arm 14 and operated by the thumb wheel 19. The usual illuminating mirror 20 is provided for directing light through a slide bearing the object on the stage 13 and into the objective 12.

Said objective 12 is shown in detail in Fig. 2. It comprises the tubular support 22 threaded as at 23 at its upper end for insertion into the lower end of the microscope tube 24. In the form shown, a central opening as 25 is made in the tube 22, the upper end of the opening being optionally closed if desired by the thin glass plate 26 to keep dust and circulating air out of the objective and thereby to prolong the life of the reflecting surfaces. The lower conical or pyramidal surface 27 of the tube 22 is at such an angle to the axis of the tube as to permit the concave reflecting mirror 28 to be secured thereto at the proper angle to reflect the light from the object to the second mirror 29, which in turn reflects the light through the opening 25 and the tube 24, the mirror 28 focusing the image in the eye piece 11. The mirror 29 is opposite the opening 25 while the mirror 28 is opposite the opening 35, said openings being relatively offset or out of alignment with each other.

Figure 5:
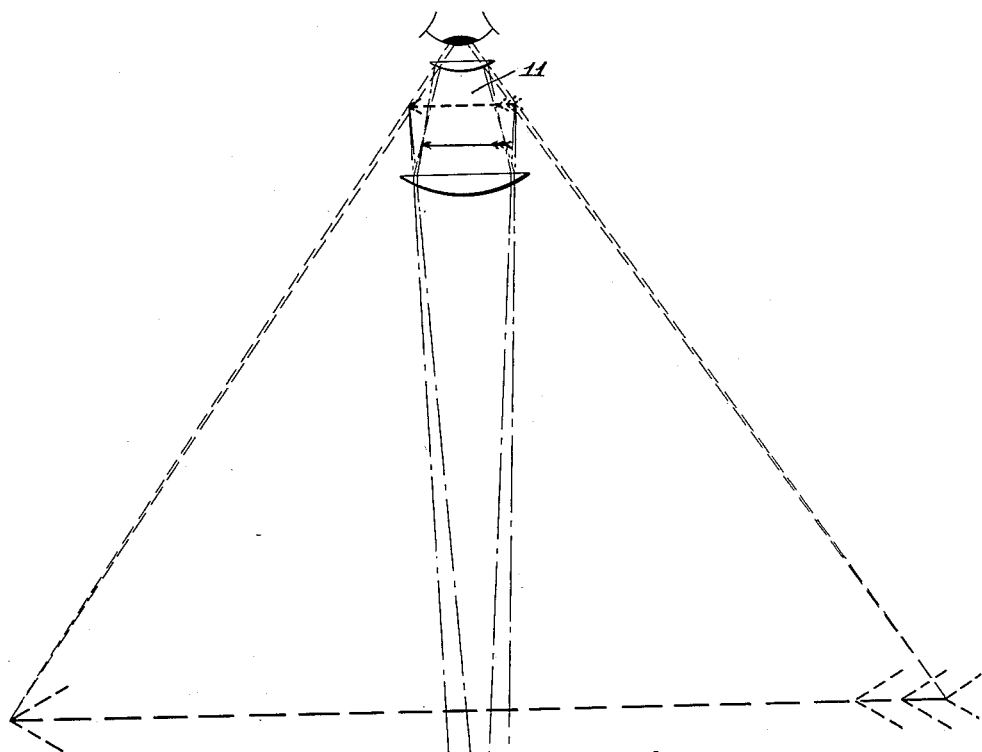
Fig. 5 is a diagrammatic section, similar to Fig. 4 of a microscope to which my invention has been applied, showing how magnification occurs.

The operative surface of said mirror 28 is a surface of revolution and while theoretically an ellipsoid of revolution, I have found that for practical purposes, the surface may be spherical or any regular surface of revolution approximating the ellipsoid. Spherical surfaces are comparatively easy to grind and produce commerically, and serve the purpose of magnification sufficiently well for commercial and laboratory uses, the errors, if any, resulting from the difference between the theoretically correct ellipsoidal surface and the spherical surface being unimportant, particularly when compared to the highly desirable advantages of the resulting completely achromatic but inexpensive objective. Furthermore, the area of the reflecting surface being only a small fraction of that of the entire sphere from which it is derived, the variation in curvature from the theoretically correct ellipsoid is so small that the use of the spherical reflecting surface in the objective causes no material error. As is well understood, two focii are present in the theoretically correct ellipsoid, the object being theoretically placed at one focus of the ellipsoid and the image being thereby focussed at the other focus of the ellipsoid. In practice, however, the object 30 is not arranged at the center of the spherical surface of the mirror (Fig. 5). It is instead arranged preferably between the mirror 28 and the center of curvature of its reflecting surface. It is the off center arrangement of the object which causes magnification. The diameter of the image is proportional to its distance from the mirror 28. If it is three times as far from the mirror as the object is, then the image has a diameter three times that of the object. The image focused by the mirror 28 in the eye piece 11, is again magnified by the eye piece, the amount of the magnification being variable by adjusting the eye piece in the usual manner.

The mirror 28 may be silvered on its concave reflecting surface and may be made of glass or other suitable material and is secured to the surface 27 of the tube 22 by any suitable means such as the cement 31. At its lower end said tube is threaded as at 32 for engagement with corresponding threads of the second tube 33. The plane mirror 29 is suitably cemented to the preferably inclined interior surface 34 near the bottom of said tube and in the proper position to receive the light reflected by the mirror 28 thereon and to reflect said light through the opening 25 to the eye piece. Said second tube 33 is provided with a suitable opening 35 through which the light from the object 36 passes and impinges upon the mirror 28. The glass plate 37 may be used optionally to close the opening 35 against the entrance of dust or air into the interior of the tube 33.

Figure 3:
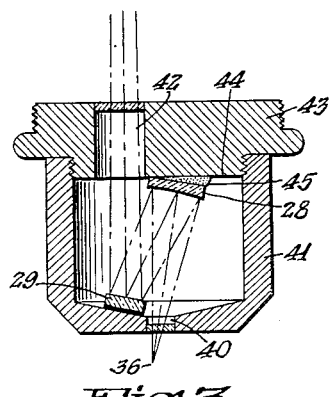
Fig. 3 is a vertical section of a modified form of the objective.

In that form of my invention shown in Fig. 3, the opening 40 of the tube 41 is made centrally in said tube instead of at one side, but the opening 42 in the upper tube 43 thereby becomes arranged non-centrally of the latter tube. This arrangement is more suitable for amateurs who are accustomed to have the light entrance opening of the objective arranged centrally. In the form shown, the concave mirror 28 is cemented at its proper angle to the bottom 44 of the tube 43 by suitable cement 45.

Figure 4:
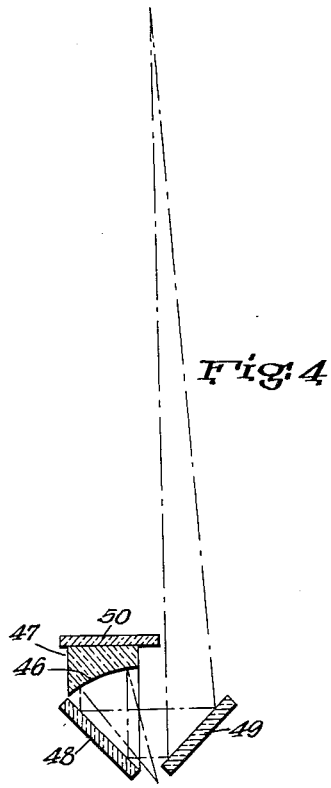
Fig. 4 is a diagrammatic view of another modified form of the objective.

Referring to the diagrammatic view shown in Fig. 4, the light from the object first strikes the spherical surface 46 of the mirror 47, being reflected thereby to the plane mirror 48, then on to the plane mirror 49 and then into the objective. The mirror 47 is arranged on one side of the microscope tube axis and is provided with a shield 50 extending transversely past said axis and preventing light from entering directly into the tube. It will be noted that the adjacent lower ends of the mirrors 48 and 49 are spaced apart sufficiently to permit the light from the object 30 to reach the reflecting surface 46 and that the light is directed by the mirror 49 in the same general direction as the light from the object 30 to the surface 46.

Figure 6:
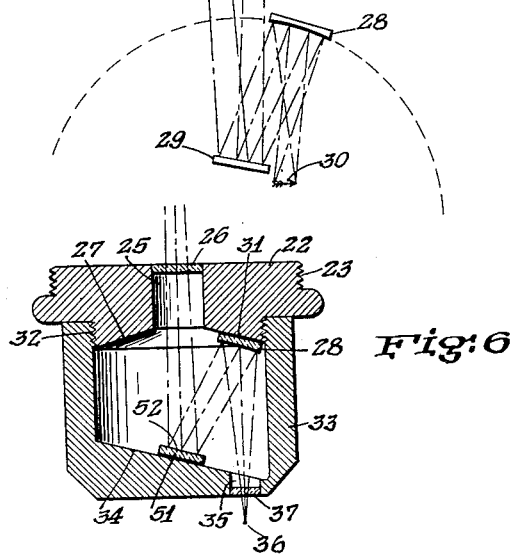
Fig. 6 is a vertical section of another modified form of my new objective wherein two curved mirrors are used to reduce the curvature of the reflecting mirrors.

In order to reduce the cost of grinding and the cost of the spherical or ellipsoidal mirrors, the plane mirror 29 or the plane mirrors 48 and 49 may be replaced by one or more concave mirrors. This has been illustrated in that form of my invention shown in Fig. 6 wherein the mirror 51, having a concave reflecting surface 52, replaces the plane mirror 29. In this case, the curvature of the mirrors 52 and 28 need not be so great as when a single concave mirror is used. Since the curvatures of the reflecting surfaces of the mirrors are reduced, the cost of grinding said mirrors is also reduced.

It will be seen that I have provided a simple but efficient microscope in which the usual objective is replaced by an objective having at least one spherical or the like concave reflecting surface in connection with another reflecting surface, but using no lenses, whereby chromatic aberration is completely eliminated, that the reflecting surface may be spherical without material error over the theoretically correct ellipsoidal surface and that I have produced a microscope objective well designed to meet the requirements of practical use.

While it has been suggested that curved reflecting surfaces or mirrors be used in telescopes, I am not aware of any previous suggestion that such surfaces could be used to replace the lenses in microscope objectives, nor is it possible to use spherical reflecting surfaces in telescopes. Curved reflecting surfaces when used in telescope objectives do not magnify as they must in microscopes. Furthermore, in telescopes, there can be no variation of power for a given objective and eye piece. In microscopes, however, the power may be varied by varying the distance between the eye piece and the objective. The curvature of the lenses have different effects in telescopes and microscopes. In the former, the greater the curvature, the less the power, whereas in microscopes, the greater the curvature of the lenses, the greater is the power. In reflecting telescopes, the resolving power is proportional only to the size of the reflecting surface, whereas in microscopes, the resolving power depends also on the curvature of the reflecting surfaces. It will thus be seen that a microscope is a different optical instrument from a telescope and functions in a different manner, particularly, since the telescope objective does not magnify and the microscope objective must in order to function properly.

While I have shown and described certain specific embodiments of my invention, I do not wish to be understood as limiting myself thereto, but intend to claim the invention as broadly as may be permitted by the state of the prior art and the scope of the appended claims.

I claim:

1. In a microscope, an eye-piece-supporting and objective-supporting tube, an adjustable eye piece at one end of the tube, a cylindrical member removably screwed into the other end of the tube and having a longitudinally extending opening therein, the axis of the opening being parallel to the axis of the tube, a tubular member screwed to the cylindrical member and having a mirror chamber therein, said tubular member being closed at its end remote from the cylindrical member and having a longitudinal opening at said end, the axes of said openings being in substantially parallel spaced relation to each other, the combined lengths of the cylindrical and tubular members being less than the length of said tube, a first spherically concave mirror supported within the chamber adjacent the cylindrical member and arranged substantially vertically above the opening in the tubular member with its reflecting surface inclined to the axis of and facing the opening in the tubular member, a second mirror in the chamber adjacent the closed end of the tubular member and substantially vertically below the opening of the cylindrical member and arranged with its reflecting surface inclined to the axis of the opening in the cylindrical member and facing the reflecting surface of the first mirror, a microscope frame including a stand, a stage carried by the frame below the supporting tube, and cooperating means on the frame and the supporting tube for adjusting the closed end of the tubular member to a position closely adjacent the stage and to arrange an object on the stage in a position offset slightly from the center of the spherical surface of said first mirror.

2. In a compound microscope, an eye-piece-supporting and objective-supporting tube, an adjustable eye piece at one end of the tube, a first member removably attached to the other end of the tube and having an opening therein, a hollow member attached to the first member and having a mirror chamber therein, said hollow member having an opening therein at its end remote from the first member, the combined lengths of the first and hollow members being less than the length of the tube, a first mirror supported within the chamber adjacent the first member and facing the opening in the hollow member, a second mirror in the chamber adjacent the outer end of the hollow member and facing the opening of the first member and also facing the reflecting surface of the first mirror, at least one of said mirrors having a concave reflecting surface, a microscope frame including a stand, a stage carried by the frame below the supporting tube and cooperating means on the frame and the supporting tube for adjusting the outer end of the hollow member to a position closely adjacent the stage.

LEO H. BROWN.